United States Patent
Piernot et al.

[19]

[11] Patent Number: 5,953,686
[45] Date of Patent: Sep. 14, 1999

[54] VIDEO CAMERA BASED COMPUTER INPUT SYSTEM WITH INTERCHANGEABLE PHYSICAL INTERFACE

[75] Inventors: Philippe P. Piernot, Palo Alto; Marcos R. Vescovi, Portola Valley; Jonathan R. Cohen, San Francisco; Rafael Granados, Berkeley; Golan Levin, Sunnyvale; Justin Willow, Stanford, all of Calif.

[73] Assignee: Interval Research Corporation, Palo Alto, Calif.

[21] Appl. No.: 08/675,104

[22] Filed: Jul. 3, 1996

Related U.S. Application Data

[60] Provisional application No. 60/001,875, Aug. 3, 1995.

[51] Int. Cl.[6] ................................................ G01N 21/00
[52] U.S. Cl. .......................... 702/150; 702/152; 356/348
[58] Field of Search .............................. 364/559; 356/347, 356/376, 348; 702/150, 152; 345/158; 250/550, 221; 248/176.1

[56] References Cited

U.S. PATENT DOCUMENTS

| | | | |
|---|---|---|---|
| 4,341,385 | 7/1982 | Doyle et al. | 273/237 |
| 4,561,017 | 12/1985 | Green et al. . | |
| 4,843,568 | 6/1989 | Krueger et al. | 364/518 |
| 4,873,398 | 10/1989 | Hubby, Jr. | 178/18 |
| 5,082,286 | 1/1992 | Ryan et al. | 273/238 |
| 5,088,928 | 2/1992 | Chan | 434/339 |
| 5,188,368 | 2/1993 | Ryan | 273/237 |
| 5,330,380 | 7/1994 | McDarren et al. | 446/397 |
| 5,511,148 | 4/1996 | Wellner | 395/106 |
| 5,539,514 | 7/1996 | Shishido et al. | 356/237 |
| 5,561,526 | 10/1996 | Huber et al. | 356/376 |
| 5,729,704 | 3/1998 | Stone et al. | 395/346 |

FOREIGN PATENT DOCUMENTS

| | | |
|---|---|---|
| 91/01543 | 2/1991 | European Pat. Off. . |
| 0576187 A1 | 6/1992 | European Pat. Off. . |
| 0606790A2 | 7/1994 | European Pat. Off. . |
| 2607400 | 11/1986 | France . |
| 3813779A1 | 11/1989 | Germany . |
| 844011 | 7/1979 | Russian Federation . |
| 2103943 | 7/1981 | United Kingdom . |
| 2237514 | 5/1991 | United Kingdom . |

OTHER PUBLICATIONS

Wellner, Pierre, Mackay, Wendy, Gold, Rich, Guest Editors, "Computer–Augmented Environments: Back to the Real World Introduction", vol. 36, No. 7, Communications of the ACM, Jul. 1993.

Spreitzer, Mike and Theimer, Marvin, "Scalable, Secure, Mobile Computing with Location Information", vol. 36, No. 7, Communications of the ACM, Jul. 1993.

Baudel, Thomas and Beaudoulin–Lafon, Michel, "Charade: Remote Control of Objects using Free–Hand Gestures", vol. 36, No. 7, Communications of the ACM, Jul. 1993.

Krueger, Myron W., "Environmental Technology: Making the Real World Virtual", vol. 36, No. 7, Communications of the ACM, Jul. 1993.

Fitzmaurice, George W., "Situated Information Spaces and Spatially Aware Palmtop Computers", vol. 36, No. 7, Communications of the ACM, Jul. 1993.

(List continued on next page.)

Primary Examiner—Kamini Shah
Attorney, Agent, or Firm—Beyer & Weaver, LLP

[57] ABSTRACT

A computer input system and method is described which includes a spatial reference member having a body with a first surface and an opposing second surface. The spatial reference member separates a first spatial region including the first surface from a second spatial region including the second surface. A physical object is movable within the first spatial region. Optical indicia tracks the physical object through the body. The optical indicia is observable from the second spatial region. An optical detector positioned in the second spatial region tracks the optical indicia and develops signals which may serve as inputs to a computer. The object may emit a signal which is tracked by the optical detector.

1 Claim, 15 Drawing Sheets

OTHER PUBLICATIONS

Azuma, Ronald, "Tracking Requirements for Augmented Reality", vol. 36, No. 7, Communications of the ACM, Jul. 1993.

Feiner, Steven, MacIntyre, Blair, and Seligmann, Dorée "Knowledge–Based Augmented Reality", vol. 36, No. 7, Communications of the ACM, Jul. 1993.

Resnick, Mitchel, "Behavior Construction Kits", vol. 36, No. 7, Communications of the ACM, Jul. 1993.

Gold, Rich, "This is not a Pipe", vol. 36, No. 7, Communications of the ACM, Jul. 1993.

Weiser, Mark, "Some Computer Science Issues in Ubiquitous Computing", vol. 36, No. 7, Communications of the ACM, Jul. 1993.

Elrod, Scott, Hall, Gene, Costanza, Rick, Dixon, Michael, and des Riviéres, Jim, "Responsive Office Environments", Jul. 36, No. 7, Communications of the ACM, vol. 1993.

Wellner, Pierre, "Interacting with Paper on the DigitalDesk", vol. 36, No. 7, Communications of the ACM, Jul. 1993.

Mackay, Wendy, Velay, Gilles, Carter, Kathy, Ma, Chaoying, and Pagani, Daniele, "Augmenting Reality: Adding Computational Dimensions to Paper", vol. 36, No. 7, Communications of the ACM, Jul. 1993.

410

{ $t_i$; $X_i$; $Y_i$; #pixels; $X_{min}$; $X_{max}$; $Y_{min}$; $Y_{max}$; O; ID }

VIDEO CAMERA BASED COMPUTER INPUT SYSTEM WITH INTERCHANGEABLE PHYSICAL INTERFACE

CROSS REFERENCE TO RELATED APPLICATIONS

This application claims the benefit of U.S. Provisional Application No. 60/001,875 filed Aug. 3, 1995 entitled, "Computerized Interactor Systems And Methods For Providing Same." by Cohen, et. al., having assignment rights in common with the present invention, is herein incorporated by reference.

BACKGROUND OF THE INVENTION

This invention relates generally to computer input devices and more particularly to optical detector based interface devices.

It has become increasingly common to computerize systems, from the trivial (e.g., the computerized toaster or coffee pot) to the exceedingly complex (e.g., complicated telecommunications and digital network systems). The advantage of computerization is that such systems become more flexible and powerful. However, the price that must be paid for this power and flexibility is, typically, an increase in the difficulty of the human/machine interface.

The fundamental reason for this problem is that computers operate on principles based on the abstract concepts of mathematics and logic, while humans tend to think in a more spatial manner. People inhabit the real world, and therefore are more comfortable with physical, three-dimensional objects than they are with the abstractions of the computer world. Since people do not think like computers, metaphors are adopted to permit people to effectively communicate with computers. In general, better metaphors permit more satisfying communications between people and computers. There are, of course, a number of human/computer interfaces which allow users, with varying degrees of comfort and ease, to interact with computers. For example, keyboards, computer mice, joysticks, etc. allow users to physically manipulate a three-dimensional object to create an input into a computer system. However, these human/computer interfaces are quite artificial in nature, and tend to require a substantial investment in training to be used efficiently. The artificial metaphors tend to break down and systems such as keyboards and mice tend to have inherently low rates of data input.

A number of interfaces are described in the July, 1993 special issue of *Communications of the ACM,* in an article entitled "Computer Augmented Environments, Back to the Real World." which is herein incorporated by reference. The computer augmented environments reviewed in the article include immersive environments, where rooms are filled with sensors to control the settings of the room, as researched at New York University (NYU) in New York, N.Y. Another example found in the article is the electronic white boards of Wacom and others where ordinary-looking erasers and markers are used to create an electronic "ink." Wellner describes a "DigitalDesk" that uses video cameras, paper, and a special work station to move between the paper and the electronic worlds. Fitzmaurice proposes a "Chameleon" unit which allows a user to walk up to a bookshelf and press a touch-sensitive LCD strip to hear more about a selected book. Finally, MIT Media Lab has a product known as "Programmable Brick" which lets children program by snapping plastic building blocks together, where each of the building blocks includes an embedded microprocessor.

U.S. Pat. No. 4,873,398 issued to Hubby describes a digitizing tablet which is also a flat panel display. The system enables different scenes to be displayed on the tablet while a stylus which emits light moves across the transparent or translucent display surface. The light from the stylus is sensed and its position is used as input to a computer system. Although the scene projected on the display may change and the stylus may take different forms (such as a wide beam airbrush or fiber optic paint brush), the display surface itself does not change and the system is adapted to receive input only from a stylus which produces light at the designed frequency. The system does not identify the stylus and interpret the input based on the identity. The system responds to radiation at the designed wavelength, from whatever source, and "inks" the display (i.e. causes pixels of the flat panel display to become excited) at the corresponding location. The location of a stylus or pen provides input as it moves in contact with the surface of the tablet.

U.S. Pat. No. 4,843,568 issued to Krueger et. al. describes a system which observes a user and provides input based on the user's movement. Krueger et. al. teaches a way to get input directly from the motion of a user without the use of user movable objects as part of the human/computer interface. While strides have been made in attempting to improve human/computer interfaces, there is still progress to be made in this field. Sensor based input systems must somehow extract the intended input data from sensor signals which may include extraneous information caused by the user operating in the field of view of the sensors or other objects observed by the sensors. Dedicated platforms such as the DigitalDesk, the optical display tablet, and the Lego block programming system provide application-specific interfaces which are easy to use, but each platform requires expensive application-specific hardware. In many cases, it may not be economically feasible to provide dedicated hardware with each individual software application. It is also undesirable to require the user to store a piece of hardware per software application. What is needed is a system capable of efficiently filtering meaningful data from noise and a system which can use a single generic hardware interface and yet allow the user to interact with the computer using tangible objects specific to the application being used.

SUMMARY OF THE INVENTION

Accordingly, the present invention provides a system and method which includes an optical platform which provides input based on the location, orientation, and image of physical objects which may be manipulated by a user.

The invention solves the problem of filtering input data from noise by providing a spatial reference member which constrains the sensor input and the range of interactions. In one embodiment, the spatial reference member is an interchangeable top face which is inserted into a preferably cube shaped frame. Other shaped frames can also be used. The outside surface of the spatial reference member interacts with objects which can either move themselves, like the hands of a running clock, or be moved by a user, like the hands of a stopped clock. Depending on the optical characteristics of the spatial reference member, only certain information about movement of objects outside the cube is transmitted to the inside of the cube where an optical detector creates an input signal based on the transmitted characteristics. In another embodiment, the spatial reference member is opaque so that all optical information outside the cube is filtered and only object movement which is mechanically coupled to optical indicia which are observable inside the cube may be observed by the optical detector. Since a variety of spatial reference members with different interactions and different objects may be inserted into the frame, a common user interface system, i.e. the frame and detector, is provided that allows application specific elements to be interchangeably selected.

As mentioned above, the spatial reference member in one embodiment is opaque and a mechanical link extends through it to couple the physical object to the optical indicia. In other embodiments, a magnetic field or an electrostatic field couples the physical object to the indicia. In another embodiment, the spatial reference member is transparent so that the visual image of the physical object is propagated through it. The spatial reference member is translucent in another embodiment so that only objects sufficiently proximate to its surface can be observed from the other side. The objects themselves or else the indicia coupled to the objects can also emit signals or reflect signals which are tracked by the optical detector.

In another embodiment, the spatial reference member includes optically discernible information viewable by the optical detector in the form of a bar code. The bar code includes both program identity and program code for the application which uses that spatial reference member.

Other embodiments include a variety of different surface characteristics for the spatial reference member. One spatial reference member is inclined substantially from the horizontal. Another spatial reference member is curved and others have an irregular surface or are made from flexible material. Polarizing filters are used as the material to construct the spatial reference member in another embodiment and other surface characteristics such as elasticity are varied as well.

The different spatial reference members provide unique interchangeable interfaces which effectively filter input information from background noise. These and other advantages of the present invention will become apparent upon reading the following detailed descriptions and studying the various figures of the drawings.

DETAILED DESCRIPTION OF THE PREFERRED EMBODIMENTS

Figure 1:
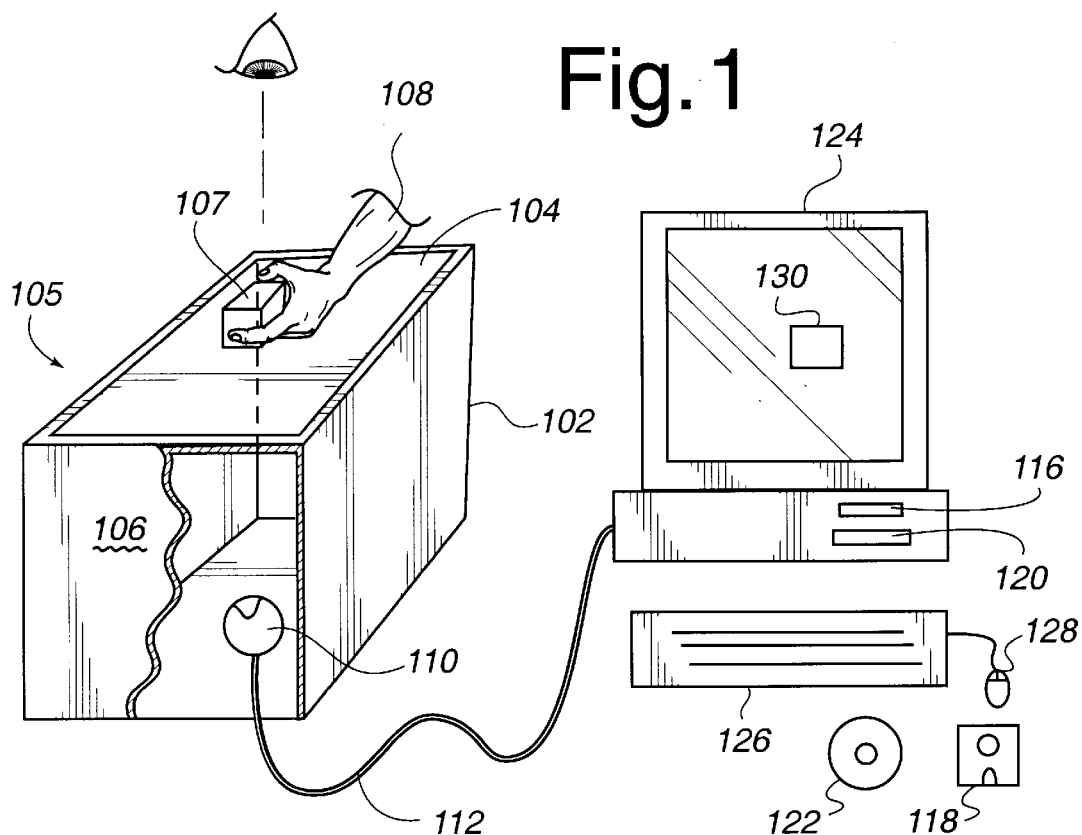
FIG. 1 is a video camera based computer input system with an interchangeable physical interface.

FIG. 1 shows a video camera based computer input system with an interchangeable physical interface. Member supporting frame 102 supports spatial reference member 104. The body of spatial reference member 104 separates a first spatial region 105 which includes the first surface of spatial reference member 104 from a second spatial region 106 which includes the opposing second surface of spatial reference member 104. A physical object 107 that may be manipulated by a user 108 is located in the first spatial region 105. Optical detector 110 is located in the second spatial region 106 and is oriented to observe optical indicia associated with physical object 107. In one embodiment, Optical detector 110 is a QuickCam® video camera manufactured by Connectix, Inc. in San Mateo Calif. In other embodiments, Optical detector 110 is a CCD array or infrared detector.

Information from optical detector 110 is fed by I/O cable 112 to processing unit 114. Processing unit 114 preferably includes floppy disc drive 116 into which floppy disc 118 containing programming information or data is inserted, and CD-ROM drive 120 into which a CD 122 is inserted. Processing unit 114 is also connected to monitor 124, keyboard 126, and mouse 128. One of ordinary skill will recognize that other forms of fixed or removable storage media can also be included.

Visual image 130, shown on monitor 124 in FIG. 1, is an image of physical object 107. Visual image 130 is an example of an optical indicia which is associated with physical object 107 and observed by optical detector 110. Other optical indicia include an infrared signal emitted or reflected from physical object 107, in which case optical detector 110 is an infrared detector, or any other signal or object which tracks object 107. The optical indicia is displayed directly on monitor 124, and the optical indicia is used as input into a computer program.

Figure 2:
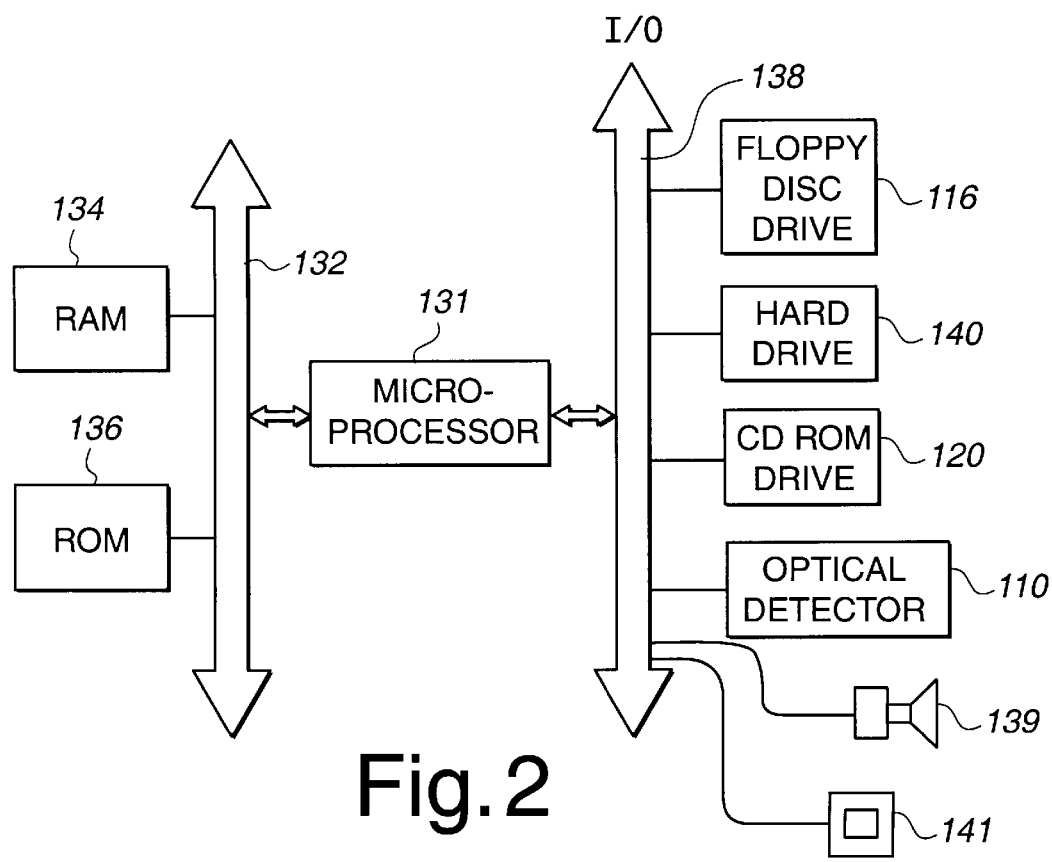
FIG. 2 shows a processing unit which receives input signals from the system.

FIG. 2 shows processing unit 114, which includes microprocessor 131, in more detail. Microprocessor 131 is connected to memory bus 132, which passes signals to and from random access memory 134 and read-only memory 136. Microprocessor 131 is also connected to I/O bus 138 which passes signals to and from floppy disc drive 116, hard disc drive 140, CD-ROM drive 120, optical detector 110, speaker 139, and monitor 141.

One feature of an embodiment of the present invention is that a number of spatial reference members 104 can be interchangeably connected to member supporting frame 102. As shown below, there are spatial reference members having different surface characteristics, various movable parts, and different optical properties or combinations of optical properties. For purposes of the following examples, the spatial region containing objects which are manipulated by a user will be referred to as lying "above" spatial reference member 104, and the spatial region from which the objects are observed will be referred to as lying "below" spatial reference member 104. It should, however, be recognized that either member supporting frame 102 or spatial reference member 104, or both, may be rotated in any direction so that the first spatial region 105 may lie partially or wholly beside or below the second spatial region 106 depending on the orientation of spatial reference member 104.

Figure 3A:
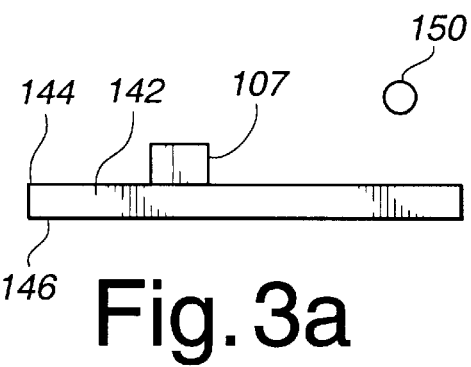
FIGS. 3a, 3b, and 3c show a translucent spatial reference member.
Figure 3B:
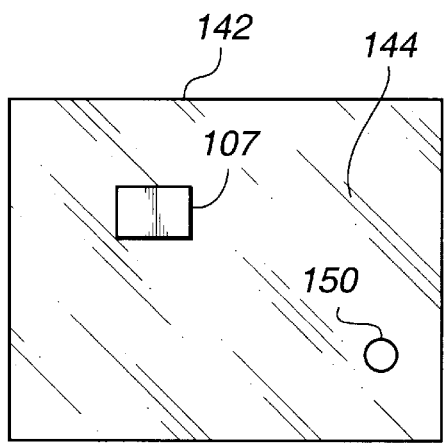
Figure 3C:
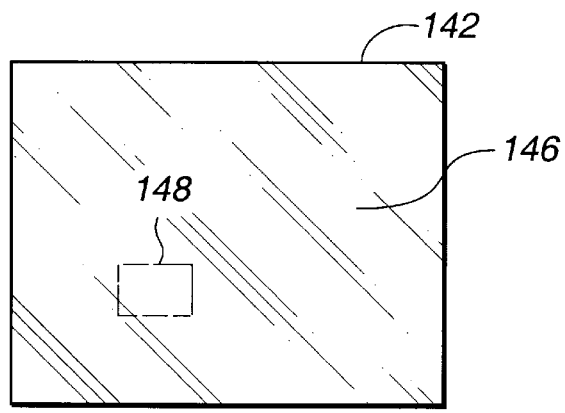

FIGS. 3a–3c show a translucent spatial reference member 142. Translucent spatial reference member 142 has a first surface 144 on or near which physical object 107 is placed. Translucent spatial reference member 142 separates a first region which includes first surface 144 and physical object 107 from a second region which includes opposing surface 146 and optical detector 110. FIG. 3b shows a top view of translucent spatial reference member 142 in which first surface 144 and physical object 107 are visible. FIG. 3c shows a bottom view of translucent spatial reference member 142 in which opposing surface 146 is visible. Because translucent spatial reference member 142 is translucent, transmitted optical image 148 of physical object 107 is visible through translucent spatial reference member 142.

Translucent spatial reference member 142 acts as a filter because only objects which are in close proximity to first surface 144 will transmit an image from first surface 144 to opposing surface 146. Filtered object 150, for example, is not in close proximity to first surface 144, and little or no discernible image of filtered object 150 is visible in FIG. 3c.

Figure 4A:
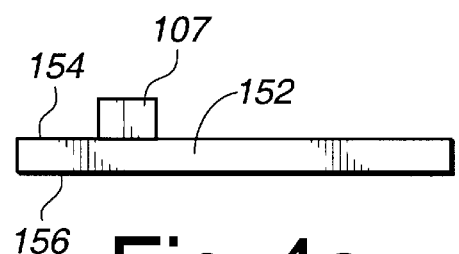
FIGS. 4a, 4b, and 4c show a transparent spatial reference member.
Figure 4B:
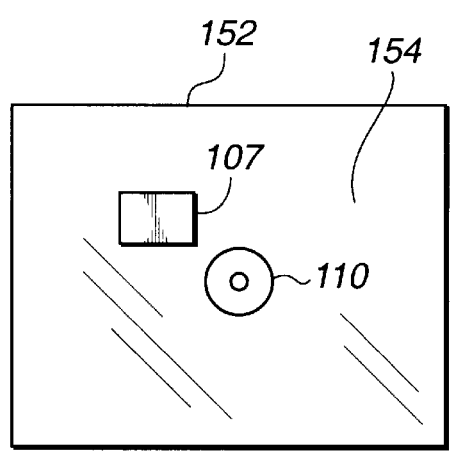
Figure 4C:
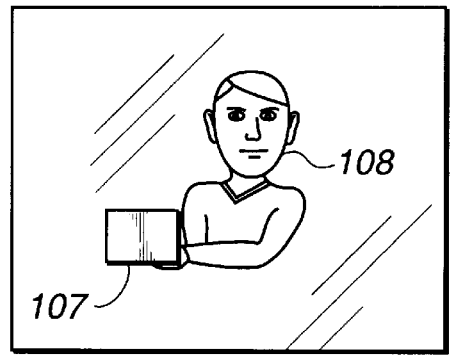

FIGS. 4a–4c show a transparent spatial reference member 152. Transparent spatial reference member 152 includes a surface 154 and an opposing surface 156. Physical object 107 may either rest on surface 154 or be located anywhere else in the first spatial region 105 which includes surface 154. Since transparent spatial reference member 152 is transparent, physical object 107 will be visible from a second spatial region 106 which includes opposing surface 156 even if physical object 107 is not in close proximity to surface 154. FIG. 4b shows a view from the top of transparent spatial reference member 152. Surface 154 is shown with physical object 107 resting on top. Physical object 107 may also be located anywhere in the region above surface 154. Optical detector 110, located in the second spatial region 106, is visible through transparent spatial reference member 152. FIG. 4c shows a view from the second spatial region 106 below transparent spatial reference member 152. Because transparent spatial reference member 152 is transparent, physical object 107 and user 108 are both visible.

Figure 5A:
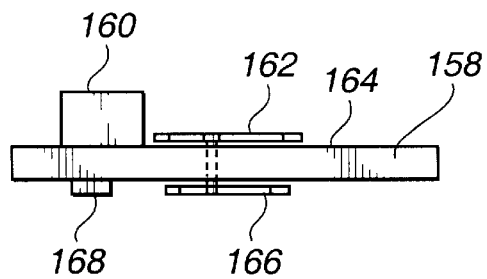
FIGS. 5a, 5b, and 5c show an opaque spatial reference member.

FIG. 5a shows an opaque spatial reference member 158. "Opaque" in this example means that spatial reference member 158 does not transmit visible light, but "opaque" may also refer to a member which does not transmit any particular type of radiation. Similarly, when "translucent" or "transparent" or any other term describing the interaction of the surface with visible light is used, it should be understood that the surface could similarly react with any other type of radiation such as infrared or ultraviolet radiation. Objects 160 and 162 are located in a first spatial region 105 which includes surface 164 of opaque spatial reference member 158. Physical object 162 is shown mechanically coupled to indicia 166. Physical object 160 is coupled by a force to indicia 168. The force may be a magnetic or electrostatic force, or any other force so long as it causes indicia 168 to track physical object 160. In one embodiment, physical object 162 includes the hands of a clock. Indicia 166 is a pair of corresponding hands which track the movement of the hands which comprise physical object 162.

Figure 5B:
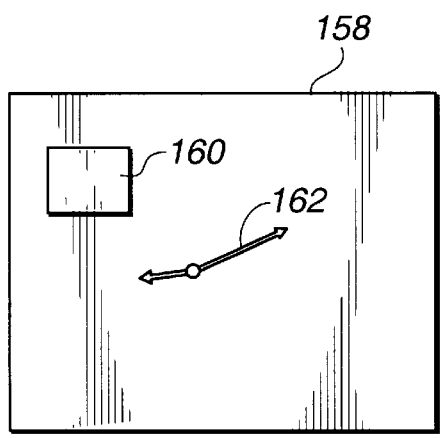
Figure 5C:
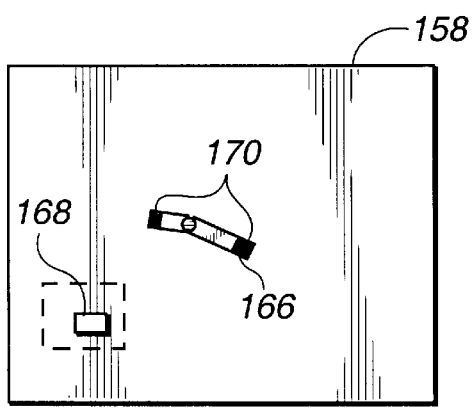

FIG. 5b shows a top view of opaque spatial reference member 158. Physical objects 162 and 160 are visible and may be manipulated by the user. FIG. 5c shows a bottom view of opaque spatial reference member 158. Because opaque spatial reference member 158 is opaque, physical objects 160 and 162 are not seen. Indicia 166, which may track the movement or orientation or both movement and orientation of physical object 162, is shown, and indicia 168 which tracks the movement and orientation of physical object 160 is also shown.

Indicia 166 may not be accessible to the user and may include optical enhancement 170 which enables optical detector 110 to better track movement and orientation. Optical enhancement 170 may be bright spots or dark spots located at critical points corresponding to critical points on physical object 162. In the embodiment shown, optical enhancements 170 are located at positions corresponding to the end of the clock arms which comprise physical object 162. Optical enhancement 170 may include either specially visible markings or coatings, or may include a transmitter which transmits radiation that is detected by optical detector 110.

Opaque spatial reference member 158 performs a filtering function because physical object 162, physical object 160 and other objects including user 108 located in the first spatial region 105 are not visible below opaque spatial reference member 158. Indicia which track physical objects 160 and 162 located in the second spatial region 106 are likewise not visible to user 108.

FIGS. 3–5 show a direct optical path between optical detector 110 and spatial reference member 158. In other embodiments, the optical path may be bent, folded or reversed with mirrors which reflect radiation at the wavelengths being used for transmitting information from indicia 166 to optical detector 110. Optical detector 110 may therefore be oriented sideways or upside down with respect to spatial reference member 158 ,or may be located remotely, so long as the optical signal is transmitted from indicia 166 to optical detector 110.

FIGS. 3–5 show member supporting frame 102 as a cube and spatial reference member 158 as a single face of the cube. In other embodiments, member supporting frame 102 is formed into other shapes. Spatial reference member 158 can also be inserted into alternative positions on frame 102 and multiple spatial reference members can be inserted into multiple positions. In the embodiment where frame 102 is a cube, sensors for determining the orientation of the cube such as mercury switches or other sensors well known in the art are employed to determine the orientation of the cube so that a given face (for example the top face) can be designated as the face which contains the spatial reference member 158 designated for input when the cube is in the sensed orientation. Indicia from the selected face are then detected by optical detector 110 and processed. The optical detector may be manually or automatically switched to view the selected face or may be configured to view multiple faces in one image and to select the desired face from that image. Thus, the orientation of the cube determines which spatial reference member 158 from among a plurality of members attached at different faces is to be used for input.

In other embodiments, spatial reference member 158 is not physically attached to frame 102. In one embodiment, a face of frame 102 is left open and spatial reference member 158 is a continuous sheet which is slid or scrolled past the open face. In one such embodiment, the open face is the bottom face of frame 102 and spatial reference member 158 is a mat over which frame 102 may be slid, thus exposing different marks on different areas of spatial reference member 158 to optical detector 110. Translucent and transparent spatial reference members could also be used as a scrolled or sliding spatial reference member.

Figure 6A:
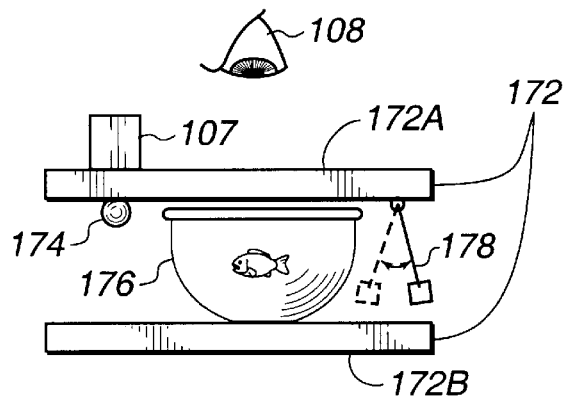
FIGS. 6a, 6b, and 6c show a polarized spatial reference member.
Figure 6B:
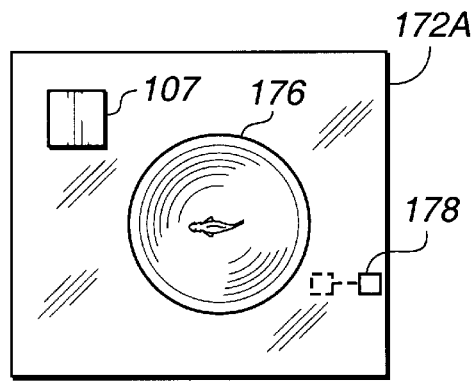
Figure 6C:
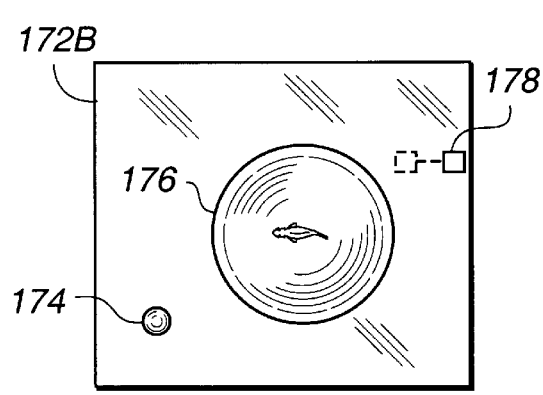

FIGS. 6a–6c show an embodiment where the body of spatial reference member 172 is split into two parts. Upper body 172a is a first polarizing filter or "polarizer" and lower body 172b is a second polarizer. Object 107 lies above upper body 172a and is coupled to indicia 174 so that indicia 174 tracks the movement and the orientation of physical object 107. Object 107 may be manipulated by user 108. Objects 176 and 178 are located between upper body 172a and lower body 172b. In the example shown, object 176 is a fishbowl containing a fish and object 178 is a pendulum. Objects 176 and 178 are shown separated from the user 108 in this example, but in some embodiments, a means for manipulating objects 176 and 178 may be provided.

FIG. 6b shows a view from above spatial reference member 172. Object 107 is visible as well as object 176 and object 178. Indicia 174 is not shown because it lies behind object 107 in this embodiment, but indicia 174 may also be visible if not blocked by object 107. Optical detector 110 is not visible in this example because upper body 172a and lower body 172b are crossed polarizers, i.e. their axes of polarization are at right angles, so that light from the region below lower body 172b is not transmitted through both polarizers.

FIG. 6c shows a view from underneath lower body 172b. Indicia 174, object 176, and object 178 are visible. Object 107 and user 108 are not visible in this example because upper body 172a and lower body 172b are crossed polarizers so that light from the first region above upper body 172a is not transmitted through both polarizers.

This embodiment illustrates another example of filtering by the spatial reference member. When spatial reference member 172 is split as shown into crossed polarizers, it is possible to define a region between the crossed polarizers which may transmit light through either polarizer. Light from above the two crossed polarizers filters, however, cannot pass through both polarizers to the other side, and light from below the two crossed polarizers likewise cannot travel through both polarizers.

Figure 7A:
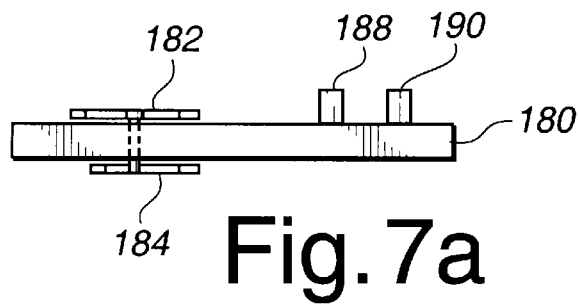
FIGS. 7a, 7b, and 7c show a spatial reference member which includes opaque, transparent, and translucent regions within the same body.
Figure 7B:
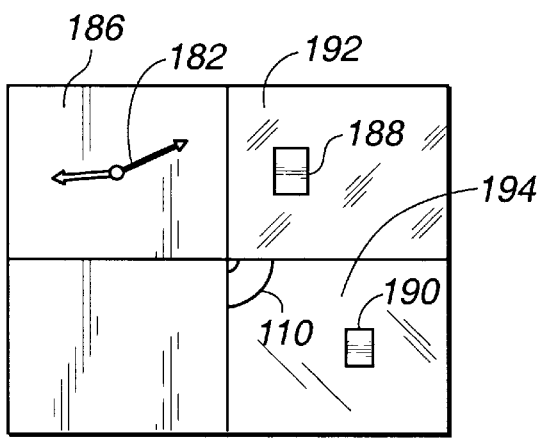
Figure 7C:
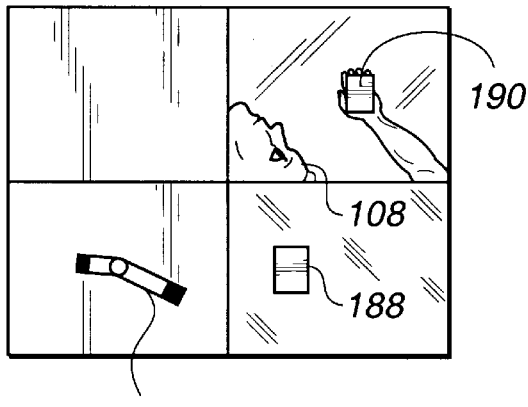

FIGS. 7a–7c show an example of a spatial reference member 180 which includes opaque, transparent, and translucent regions within the same body. Object 182 is coupled to indicia 184 through opaque region 186. Objects 188 and 190 are located above translucent region 192 and transparent region 194, respectively. FIG. 7b shows the view from above spatial reference member 180. FIG. 7c shows the view from below spatial reference member 180. Object 182 is not visible through opaque region 186 and only optical tracking indicia 196 is shown. Object 188 is visible through translucent region 192, since it lies on the surface of translucent region 192. User 108 is only visible through transparent region 194. FIGS. 7a–7c show that the optical properties of the surfaces shown in FIGS. 3–6 may be combined as desired.

Figure 8A:
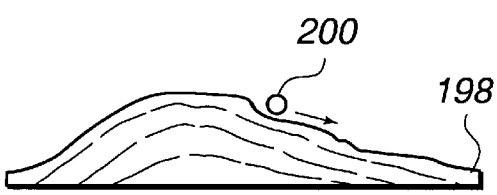
FIGS. 8a, 8b, and 8c show a contoured spatial reference member.
Figure 8B:
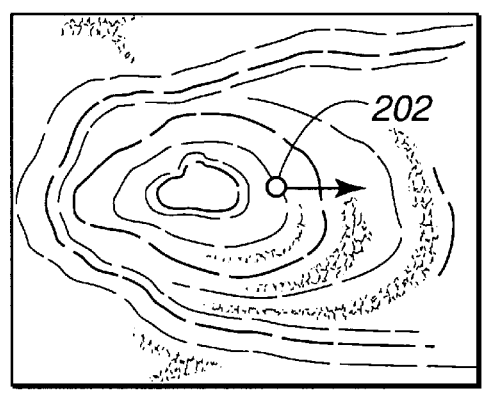
Figure 8C:
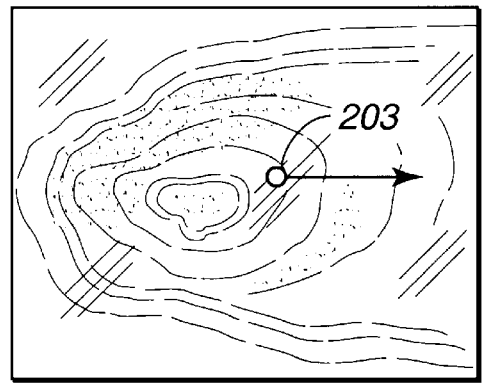

FIGS. 8a–8c show a contoured spatial reference member 198. Object 200 is shown interacting with contoured spatial reference member 198. Object 200 may interact with contoured spatial reference member 198 through the force of gravity or by other magnetic, elastic, or electrostatic forces. FIG. 8b shows indicia 202 which tracks object 200. As shown in FIGS. 3–6, contoured spatial reference member 198 may be transparent, translucent, or opaque. Indicia 202 may be an extension of object 200 through spatial reference member 198 or indicia 202 may be a separate object from object 200, which is coupled to object 200 by some force or mechanical means. Alternatively, indicia 202 may be an optical image of object 200 transmitted through a transparent or translucent contoured spatial reference member 198. In another embodiment, contoured spatial reference member 198 is a pegboard with holes and object 200 includes a peg which is inserted into a selected hole. In a similar embodiment, contoured spatial reference member 198 has indentations into which objects such as marbles are constrained to settle.

Figure 9A:
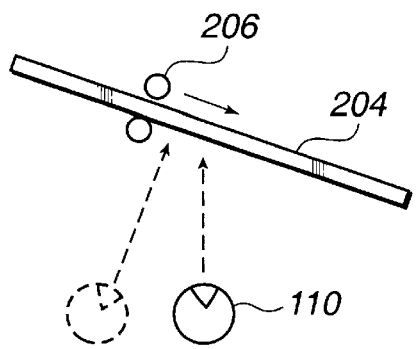
FIGS. 9a, 9b, and 9c show an inclined spatial reference member.
Figure 9B:
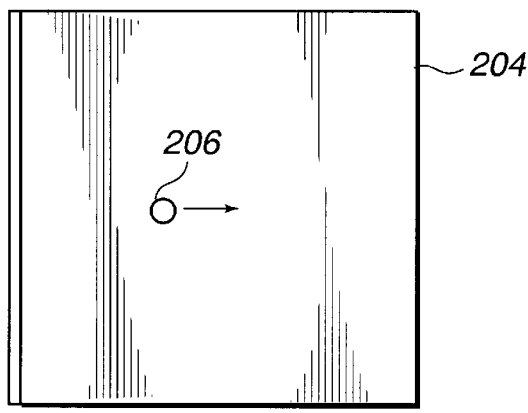
Figure 9C:
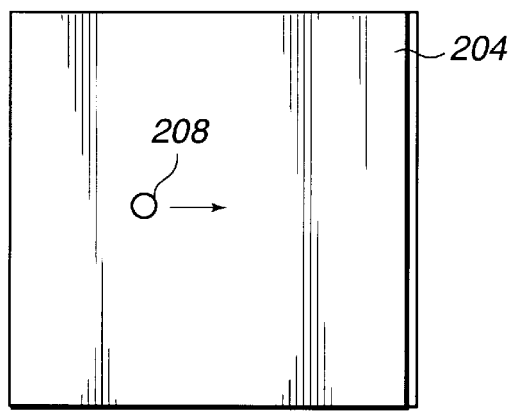

FIG. 9a shows an inclined spatial reference member 204. Physical object 206 slides or rolls down the inclined spatial reference member 204 and its progress and data relating to its progress are recorded by optical detector 110. As shown, optical detector 110 may be oriented to view spatial reference member 204 along a perpendicular line of sight or a skewed line of sight. Inclined spatial reference member 204 may have any optical property or combination of optical properties described above. In the example illustrated, inclined spatial reference member 204 is translucent. FIG. 9b shows the view from above inclined spatial reference member 204 where the user may directly observe the motion of physical object 206. FIG. 9c shows the view from below inclined spatial reference member 204 where a transmitted image 208 of physical object 206 may be tracked by optical detector 110. In another embodiment, object 206 is suspended from a string and swings as a pendulum above spatial reference member 204.

Figure 10A:
FIGS. 10a, 10b, 10c, 10d, 10e, 10f, 10g, 10h, and 10i show a spatial reference members which include moveable portions, holes, and flexible portions.
Figure 10B:
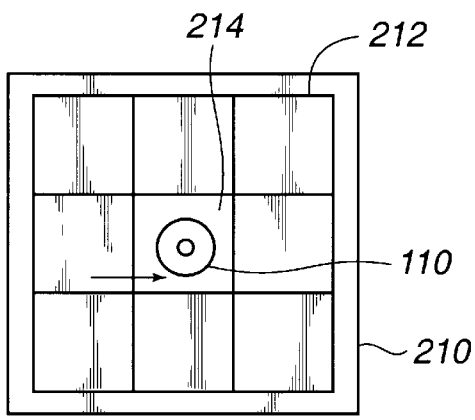
Figure 10C:
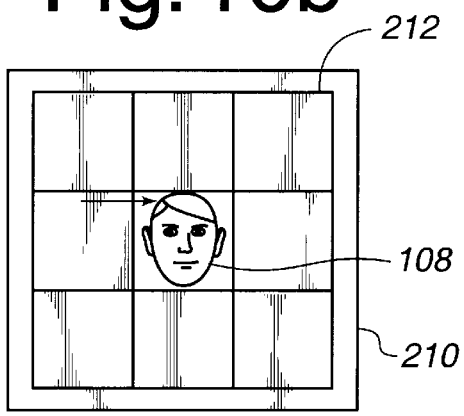

FIG. 10a is a side view of spatial reference member 210, which includes movable portions. FIG. 10b shows a view from above spatial reference member 210 when moveable portions 212 are positioned so that hole 214 lies in approximately the center. Optical detector 110 is visible from above spatial reference member 210 through hole 214. FIG. 10c shows the view from below spatial reference member 210. When moveable portions 212 are positioned so that hole 214 lies in the center, user 108 is visible through hole 214. Movable portions 212 are shown slideably engaged with each other in FIGS. 10a–10c. In certain embodiments, moveable portions 212 may also be flipped or rotated. In another embodiment, moveable portion 212 is a spherical ball rotatably mounted to extend through spatial reference member 210 so that the rotation of moveable portion 212 may be observed by optical detector 110.

As shown in FIGS. 6–10, information about objects and their interaction with the physical world may be observed by optical detector 110 and transmitted to the computer. Objects may be manipulated by the user or may interact with surfaces or physical forces. Objects may also include living things such as a fish, or items set in motion by the user and left to interact with the environment, such as a pendulum. The computer receives image data from an optical detector. As shown below, the position, area covered, the orientation, and the bounding box of the object can then be determined and processed. In the following discussion, certain processing is described as occurring within the computer, within the device driver or within the detector. It will be clear to those of skill in the art that processes implemented within one device could be moved to another within the scope of the invention.

Figure 10D:
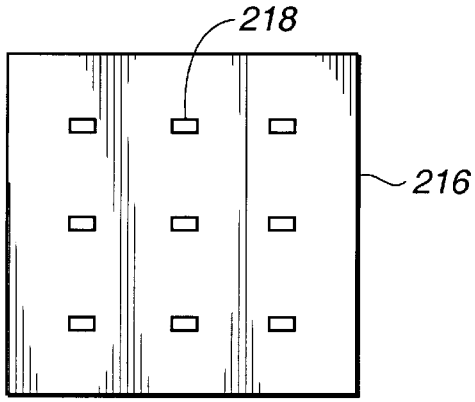
Figure 10E:
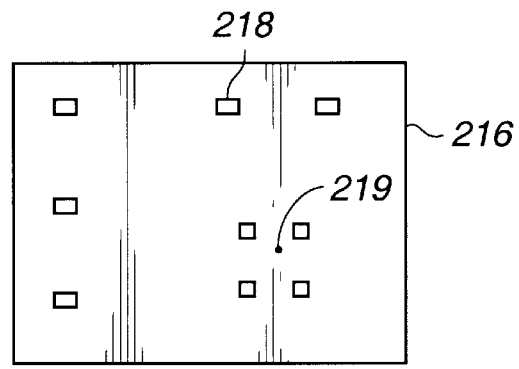

In the examples shown above the spatial reference member is comprised of stiff objects. In another embodiment, the spatial reference member is made of a deformable material such as latex. Indicia associated with the spatial reference member are visible to optical detector 110. When the spatial reference member is deformed, movement of the indicia can be tracked by optical detector 110. The indicia may comprise either markings on the spatial reference member itself or the indicia may be associated with an object. FIG. 10d shows flexible spatial reference member 216 which is marked with indicia 218. When a force is applied at contact point 219, to flexible spatial reference member 216, it is deformed and indicia 218 move as shown in FIG. 10e.

Figure 10F:
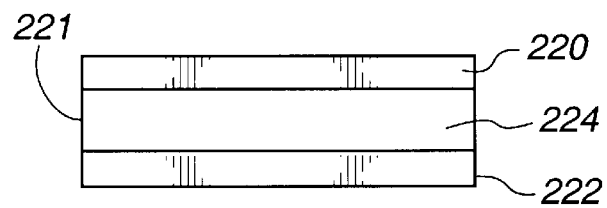
Figure 10G:
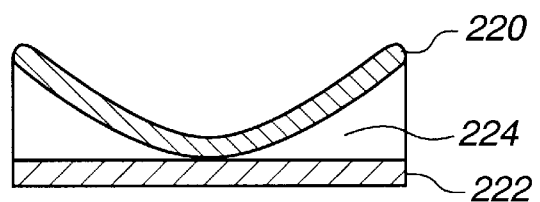
Figure 10H:
Figure 10I:
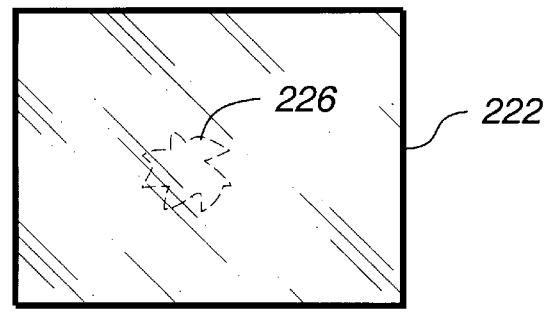

A flexible spatial reference member may be used in connection with a spatial reference member which is split in two parts as described in FIG. 6. FIG. 10f shows a flexible portion 220 of spatial reference member 221. When a force is applied to flexible portion 220, flexible portion 220 is deformed downward until it contacts stiff portion 222. A substance 224 may be inserted between flexible portion 220 and stiff portion 222. Substance 224 may be opaque so that flexible portion 220 is obscured from view until it contacts stiff portion 222. Substance 224 may also physically resist the compression of flexible portion 220 towards stiff portion 222. Substance 224 can be a liquid, a solid, a gel, or any other appropriate material. Contact of flexible portion 220 with stiff portion 222 is optically detected as shown in FIGS. 10f and 10g. In FIG. 10f, contact has not been made. FIG. 10g shows an image 226 of a contact area.

Figure 11:
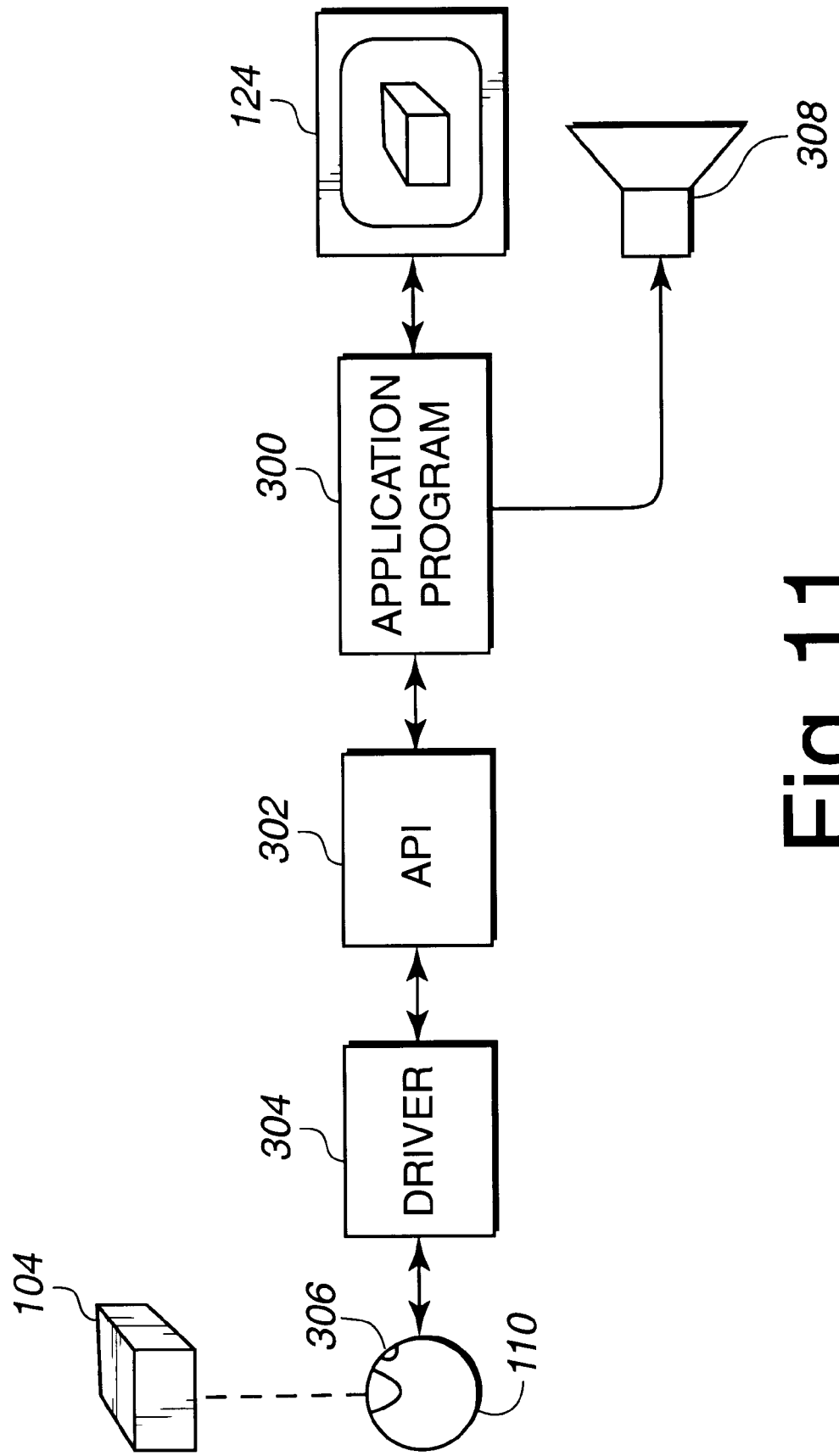
FIG. 11 shows an input system in accordance with the present invention in block diagram form.

FIG. 11 shows an input system in accordance with the present invention that includes optical detector 110, application program 300, Application Programming Interface (API) 302, and driver 304. API 302 controls optical detector 110 and data from optical detector 110 is transferred to application program 300. In one embodiment, Macromedia Director® is used to define and translate commands sent to API 302. One skilled in the art will recognize that other commercially available programs could also be used to define and translate commands. Application program 300 sends Macromedia Director commands and parameters to API 302. API 302 sends commands which control the exposure and field of view of optical detector 110 by driver 304. Optical detector 110 is oriented to observe data associated with spatial reference member 104. Microphone 306 may also be included with optical detector 110 if sound data is to be recorded. Optical detector 110 and microphone 306 send data back to driver 304. The data passes through API 302 and is available to application program 300 for processing. The field of view of optical detector 110 may be displayed on monitor 124 and the sound may be played over speaker 308.

Figure 12:
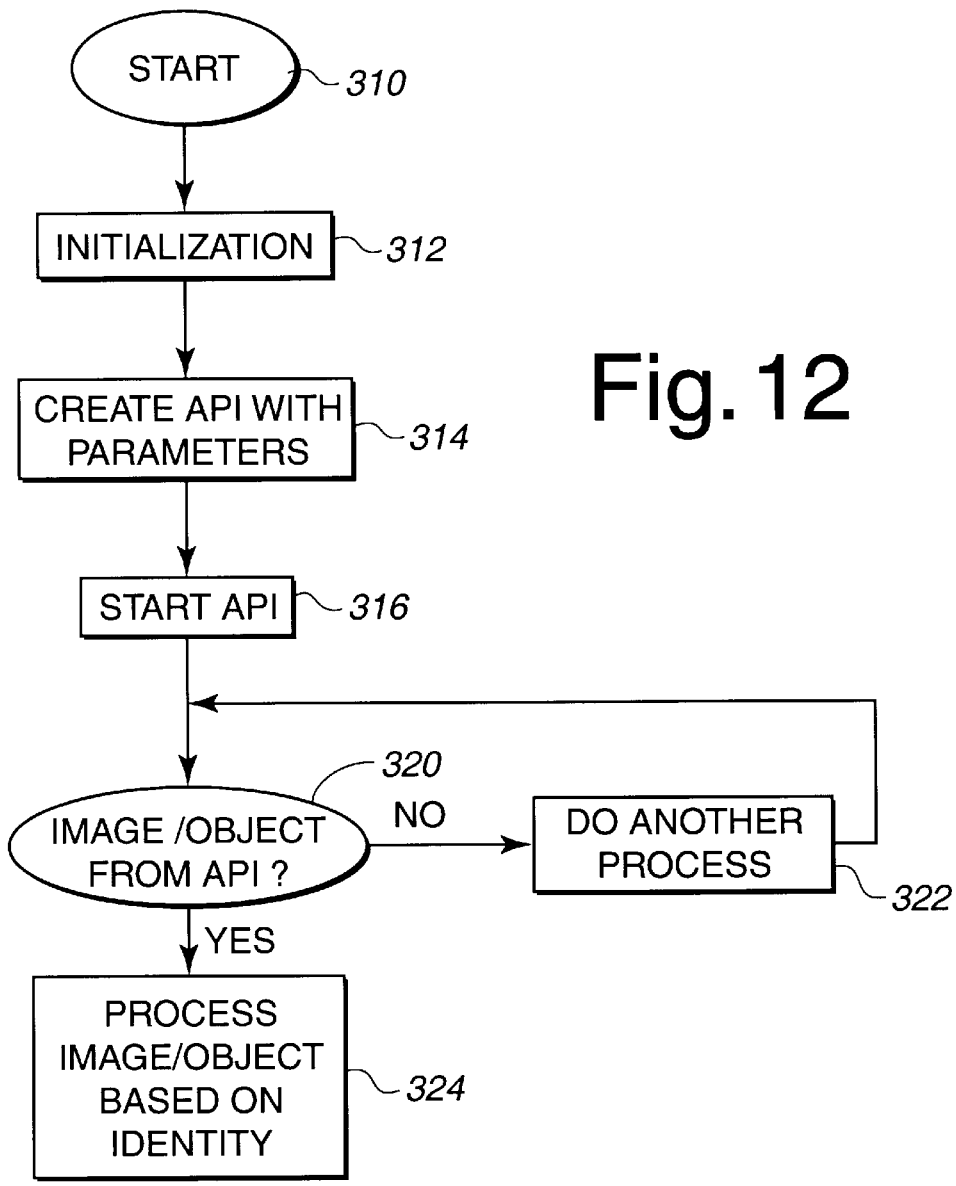
FIG. 12 conceptually illustrates the software operating in the Macromedia Director portion of the application program.

FIG. 12 conceptually illustrates the software operating in Macromedia Director portion of application program 300. The process begins at 310 and in a step 312, Macromedia Director is initialized. API 302 is initialized with parameters in step 314. The parameters may include exposure time, thresholding constants for optical detector 110, segmentation constants, and interpretation criteria. Step 316 starts the API 302. Once the API is started, step 320 checks whether an image object has been received from API 302. If no image or object has been received, then step 322 returns control back to step 320. If an image or object is detected from API 302, then the image or object is processed according to its identity in step 324. Images or objects may be processed differently depending on the identity of spatial reference member 104.

Figure 13:
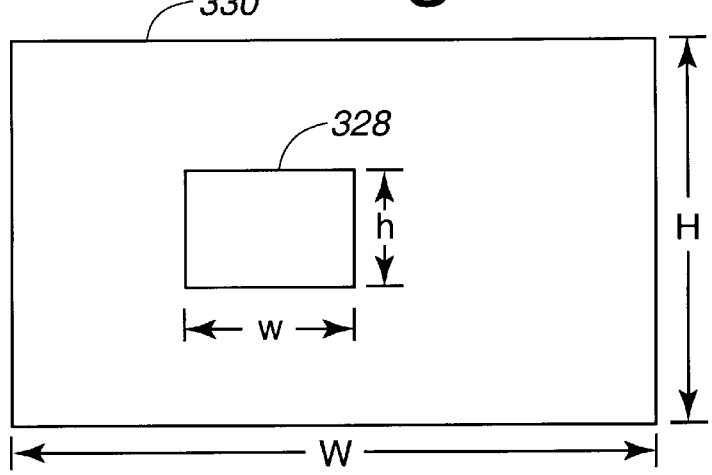
FIG. 13 illustrates a resolution rectangle and a clip rectangle.

FIG. 13 illustrates a resolution rectangle 328 within a field of view 330 of optical detector 110. Resolution rectangle 328 and field of view 330 may be controlled using the parameters which are passed to API 302. Optical detector 110 may be operated at different resolutions. The parameters passed to API 302 select an appropriate resolution based on the identity of the spatial reference member. Before the identity of the spatial reference member is determined, a default resolution is used. At lower resolutions, frames may be read from optical detector 110 more quickly than frames may be read at higher resolutions. In one embodiment, possible resolution settings are 80 by 60, 160 by 120, or 320 by 240. In order to further speed the transfer of data, clip rectangle 328 within resolution rectangle 330 is generated for certain spatial reference members. Clip rectangle 328 includes only the area the area within the field of view of optical detector 110 which contains meaningful data related to an objects of interest. Because of the constraints on the system placed on it by the known spatial reference member, all data outside clip rectangle 328 is known to be extraneous. By reading data from clip rectangle 328 and ignoring other data, the data transfer rate may be increased.

Figure 14:
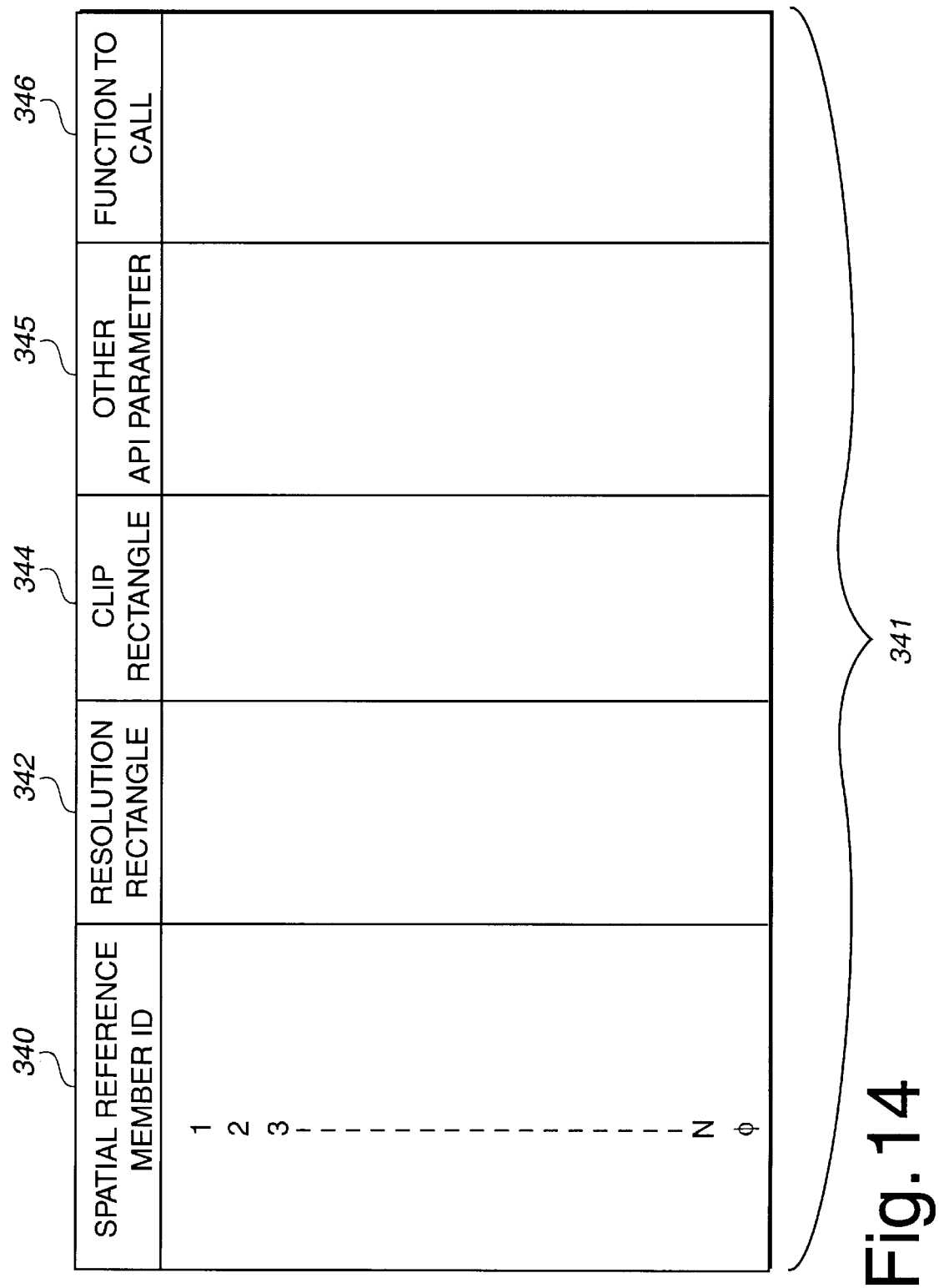
FIG. 14 shows how the identity of the spatial reference member may control the application program.
Figure 15:
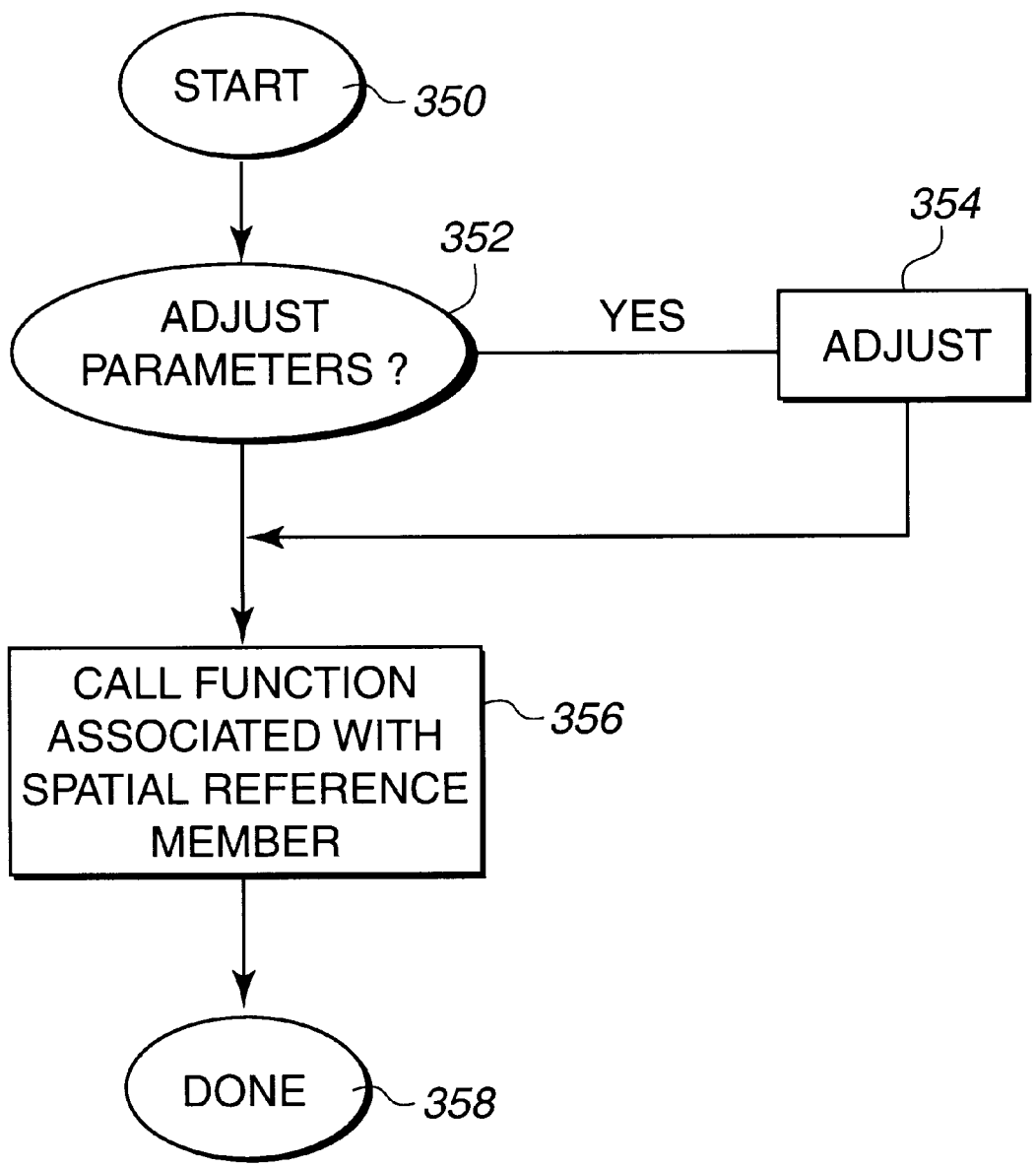
FIG. 15 illustrates how the image is processed according to its identity.

FIG. 14 shows how the identity of spatial reference member 340 controls step 316 and application program 300 in one embodiment. Each spatial reference member identification number is represented by a row in the table 341. Row $\phi$ represents initial parameters used before a spatial reference member has been determined. Each spatial reference member has associated with it a resolution rectangle 342, clip rectangle 344, and other API parameters 345. These parameters are passed to API 302 to control optical detector 110. In addition, one or more functions 346 may be called by application program 300 based on the identity of spatial reference member 104. The identity of spatial reference member 340 can be input prior to initialization of API 302, or alternatively, the identity can be determined from the output of optical detector 110. If the identity is to be determined by application program 300, then initial reference member determination parameters from row $\phi$ are first sent to API 302 and once the identity of spatial reference member 340 is known, parameters specific to that particular spatial reference member are sent. FIG. 15 illustrates how the image is processed according to its identity in step 324. Process 324 begins at 350. Step 352 determines whether the parameters are to be adjusted. If parameters are to be adjusted, step 354 adjusts the parameters for API 302, according to table 341. Step 356 calls any functions associated with spatial reference member 104 within application program 300. The process terminates at step 358.

Figure 16:
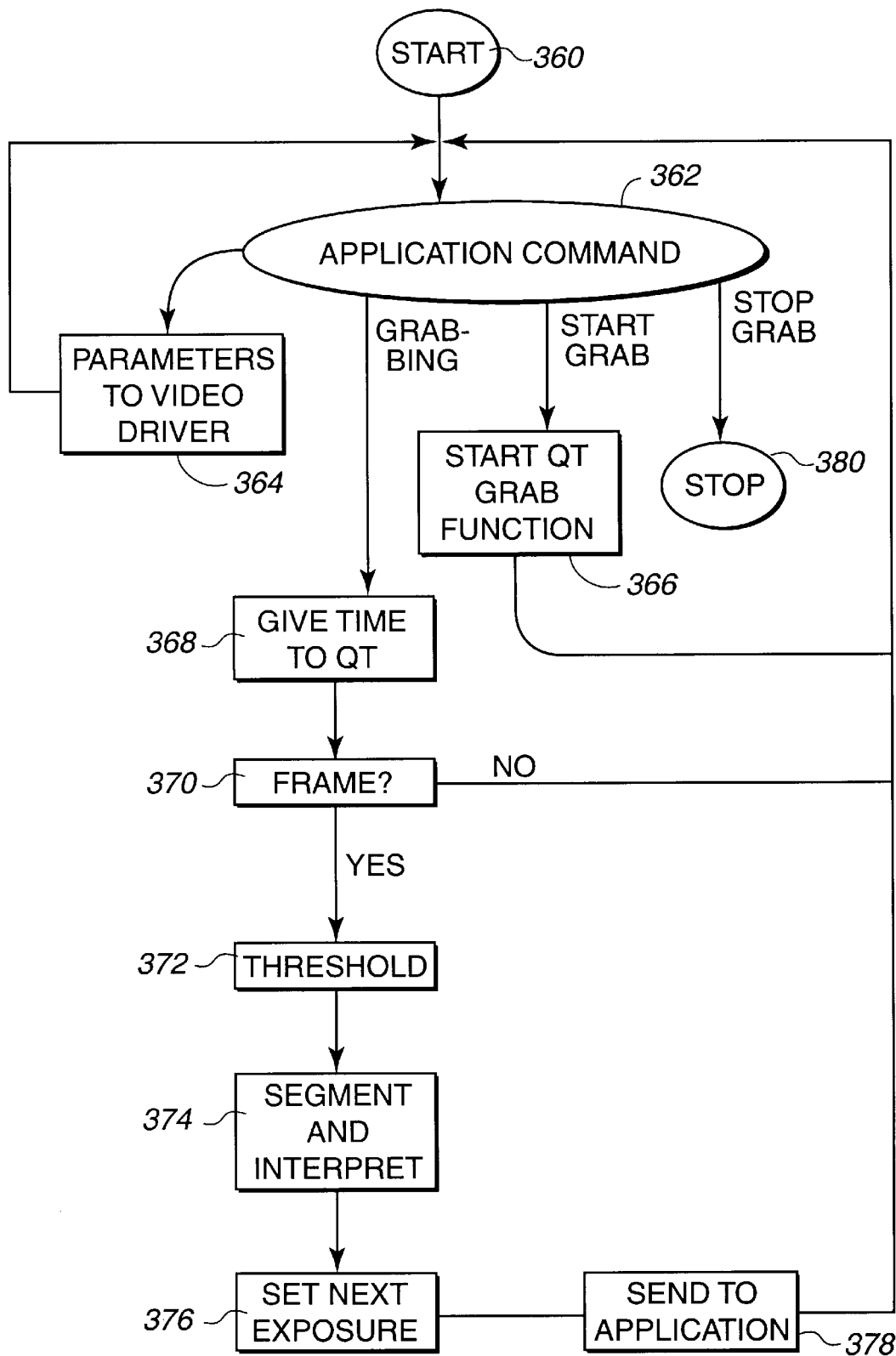
FIG. 16 illustrates the operation of the application program interface (API).

FIG. 16 illustrates the operation of API 302. The process begins at step 360. In step 362, an application command is received. If the command is to initialize, control is transferred to step 364 and parameters are sent to the video driver. The video driver used in one embodiment is QuickTime® It will be apparent to one of ordinary skill in the art that other video drivers can be used as well. If the application command is to start grabbing, control is transferred to step 366 which starts the video grab function. Once the QuickTime® grab function is started, control is transferred back to step 362. Step 362 then initiates step 368 which pauses while the video digitizer grabs a frame. Step 370 determines whether a frame has been grabbed. Until a frame is grabbed, control is continually returned to step 362. When a signal indicating that a frame has been grabbed is received, thresholding step 372, and segmentation and interpretation step 374 are performed. The exposure time for the next frame is set in step 376 and data is sent to application program 300 in step 378. Control is again transferred back to step 362, and the cycle continues until a stop grab command is received and the process is terminated at 380.

Figure 17:
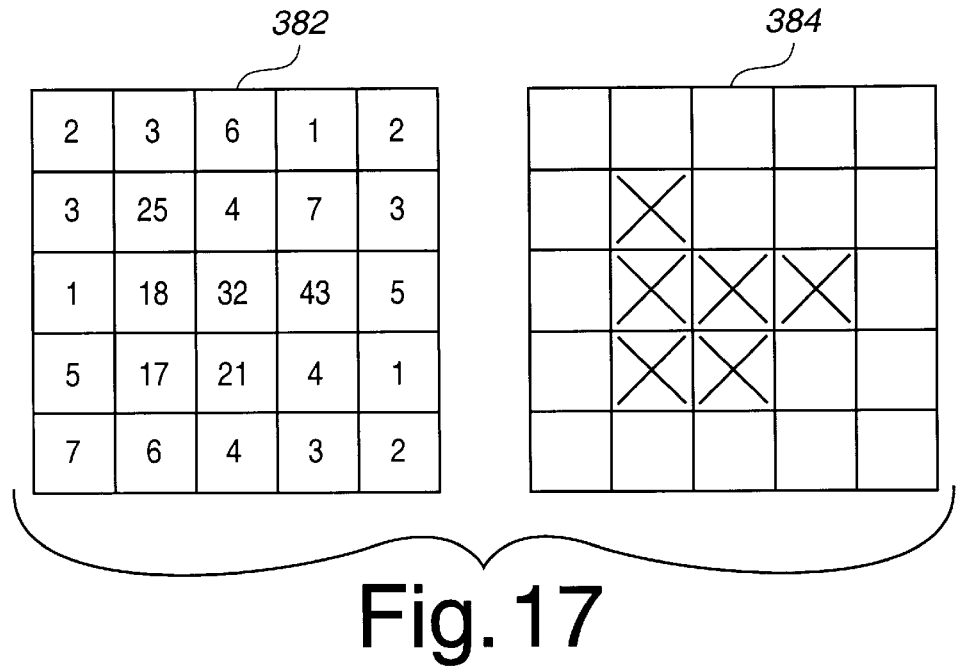
FIG. 17 illustrates how the thresholding step is accomplished.

FIG. 17 illustrates how thresholding step 372 is accomplished. Pixels 382 may have recorded gray scale information, that is, digitized information with more than two levels of data. For example, if eight bits are generated in the digitizing process, then there are 256 levels of gray scale and each of pixels 382 may store a value corresponding to one of 256 different levels. It may not be necessary for purposes of input to include gray scale values and so it may be desirable to reduce the number of possible levels to speed up processing time. For example, it is possible that only two levels of data, i.e., black and white, are needed. Such a system would have no gray scale. A threshold is determined for the data from pixel set 382 and the image is converted into active pixels and inactive pixels, as shown in thresholded pixel set 384. The numbers within pixel set 382 represent pixel values. In thresholded pixel set 384, the X's correspond to pixels which exceed the threshold (in this example, 10) and the undarkened pixels correspond to pixels which do not exceed the threshold. The threshold itself may be calibrated by either looking at a known darkness region or by analyzing the gray scale data, as will be apparent to one of skill in the art.

Figure 18:
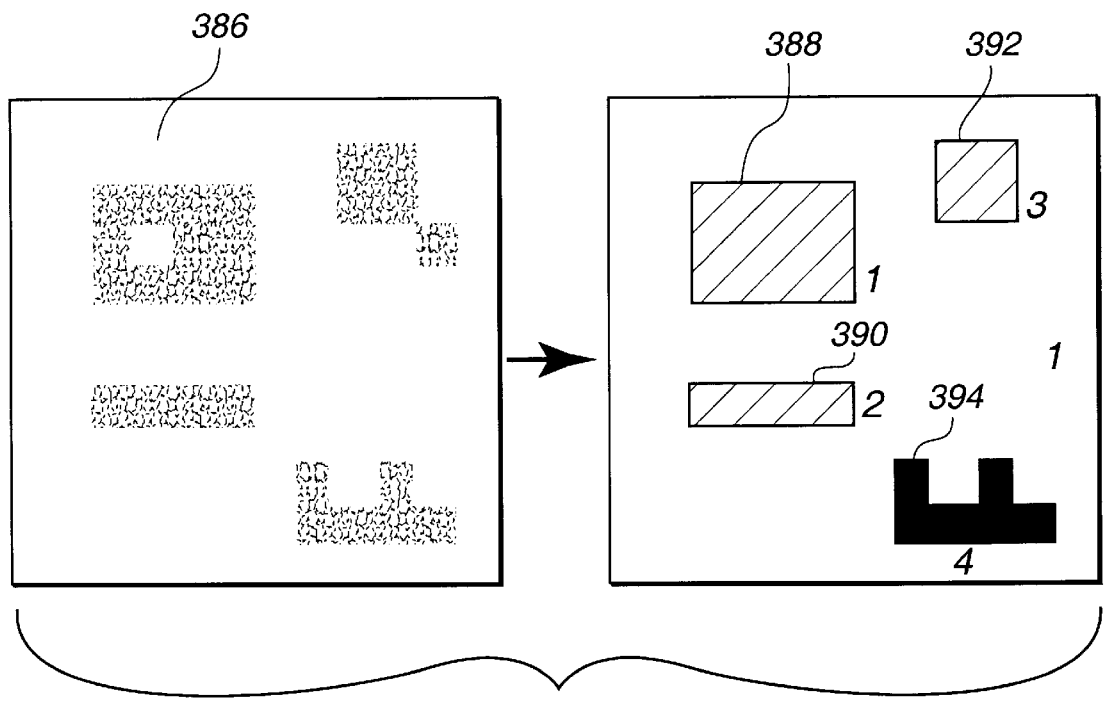
FIG. 18 illustrates the process of segmentation and interpretation.

FIG. 18 illustrates the process of segmentation and interpretation. Most objects are comprised of a number of pixels. Some pixels within objects 386 may be inaccurate as a result of noise, glare, or some other effect. As a result, objects 386 may appear to have holes or other irregularities caused by spurious data. Additionally, it may require more bandwidth to describe an object in terms of its individual component pixels instead of describing its shape. Objects 388, 390 and 392 have been segmented so that they are shown as shapes. Objects may also be interpreted to belong to a specific class of objects. Objects 388, 390 and 392 have been interpreted to belong to class numbers 1, 2 and 3, respectively, as shown by the numbers adjacent to the objects. Object 394 has been identified as an object type 4. In this example, object type 4 is a bar code. The use of bar codes as objects will be described below.

Figure 19:
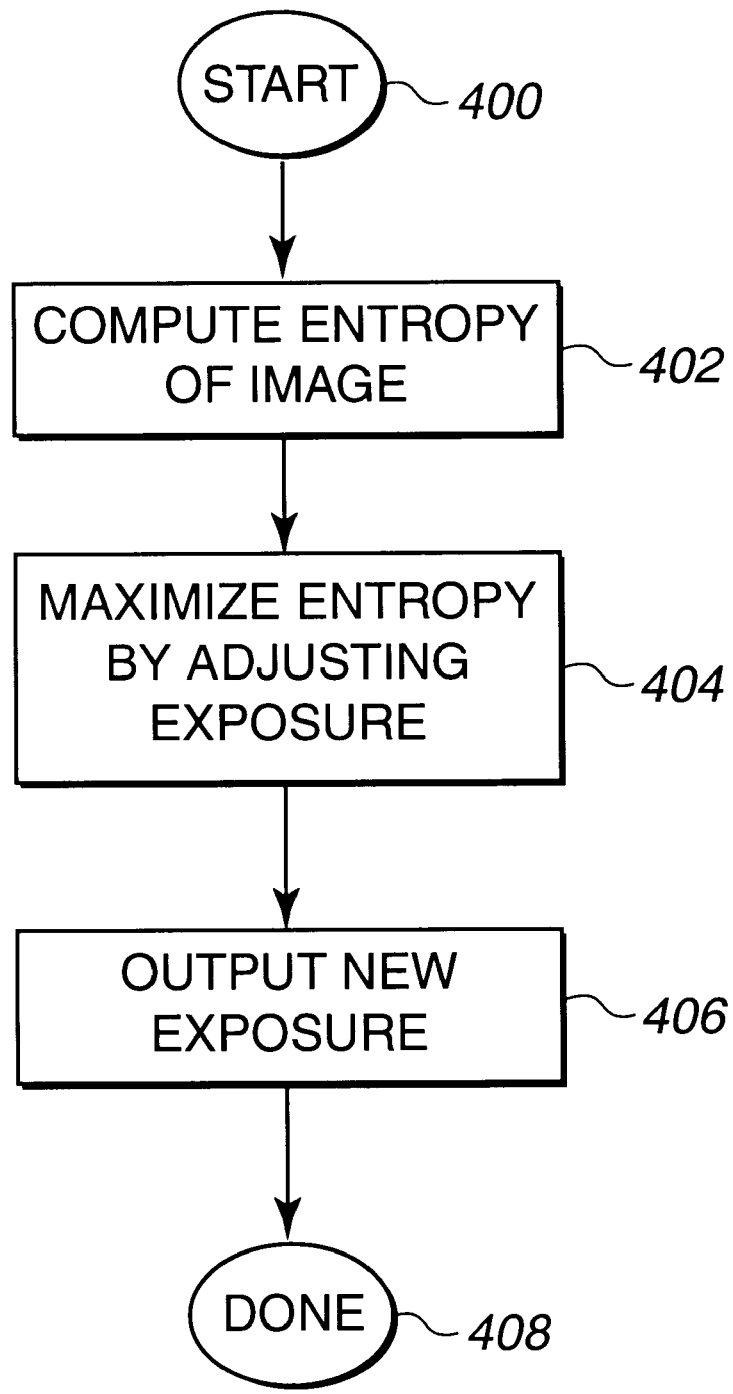
FIG. 19 illustrates how the next exposure time is set for the optical detector.

FIG. 19 illustrates step 376 which sets the next exposure time for optical detector 110. The process begins at 400. The entropy of the image is computed at 402, and step 404 computes an exposure time which will be expected to maximize the entropy of the image. In one embodiment, a PID control algorithm is used. The new exposure time is output at step 406 and the process terminates at step 408. The entropy of an image represents the amount of information contained in the image, as is well understood by those of skill in the art of information processing. Maximizing the amount of information contained in the image is one way that an optimal exposure time may be determined.

Figures 20A, 20B:
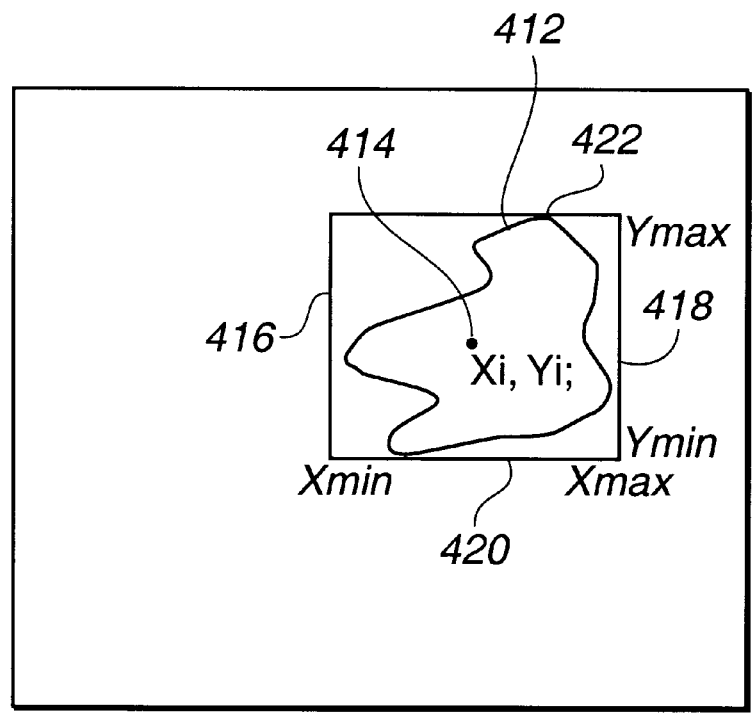
FIGS. 20a and 20b illustrate how data relating to objects may be sent to the application program.

FIGS. 20a and 20b illustrate how data relating to objects may be sent to application program 300 in step 378 of FIG. 16. Data may be transferred in an ordered set or array of numbers. In one embodiment, array 410 contains as its first argument, the type of object represented by $t_i$. The object may be, for example, a "dumb" object, represented by type 0, which would simply be a set of pixels. The object may also be a bar code represented by object type 1, or a rectangle represented by object type 2. A sample object is shown in FIG. 20b. The second and third arguments of array 410 are the X and Y coordinates of center of mass 414 of object 412. These are used to locate the object. The fourth argument shown is the number of pixels in the object. The X minimum 416 and X maximum 418, and Y minimum 420 and Y maximum 422 values for the object may also be given to determine a rectangle, or "bounding box" within which the objects will be enclosed. Next, other parameters representing data associated with object 412 may be sent as the other arguments. Such parameters include the specific identity of the object, ID, if a barcode is used, and the orientation, O, of the object. In other embodiments, specific pixel locations and values are sent and segment boundary points are sent. Any other data which describes the object can also be sent as arguments. Pixel values may be transmitted with or without thresholding step 372.

Figure 21:
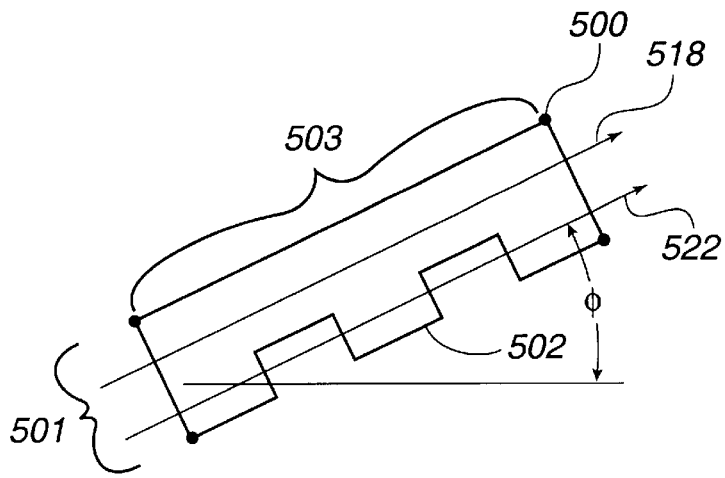
FIG. 21 illustrates a bar code which may be associated with an object or which may, itself, be an object.

FIG. 21 illustrates a bar code 500 which is associated with objects and itself is an object in one embodiment. One of ordinary skill will recognize that other bar code schemes including, for example, a circular bar code, could be used. In the embodiment shown, bar code 500 is distinguished as a bar code by the ratio of its maximum width 510 to its maximum length 503 which is referred to as its A/B ratio. All bar codes will have an A/B ratio which distinguishes bar codes from most other rectangles. In order to distinguish bar code 500 from a rectangle with the same A/B ratio, side 502 may be observed and checked to determine that it is not a straight line.

Figure 22:
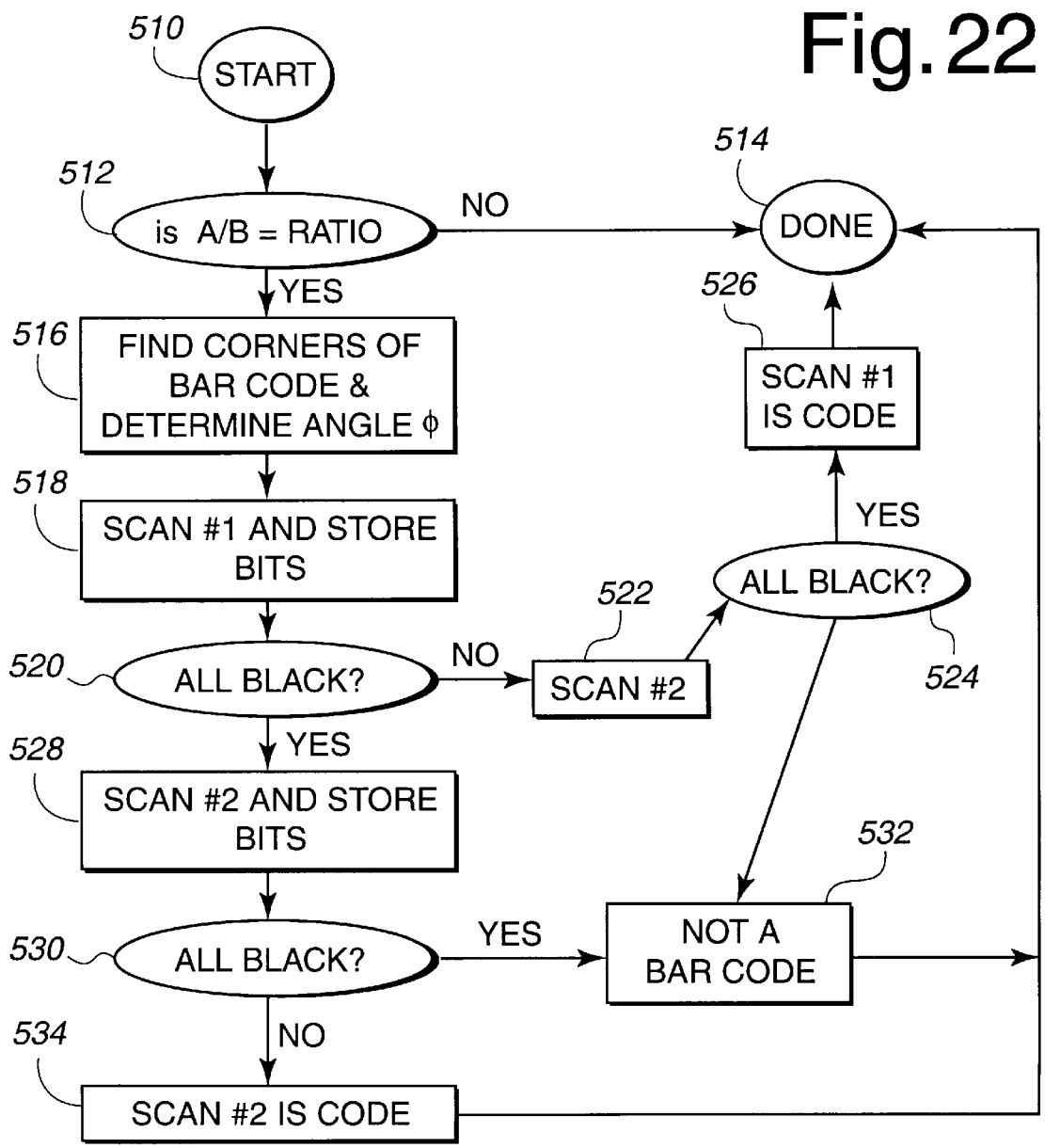
FIG. 22 illustrates how the bar code is identified and scanned.

FIG. 22 illustrates how bar code 500 is identified and scanned. The process begins at step 510. Step 512 determines whether the A/B ratio is characteristic of a bar code. If it is not, then the object is classified as not a bar code, and the process terminates at 514. If the A/B ratio is characteristic of a bar code, control transfers to step 516. Step 516 finds the corners of the bar code and determines the angle of orientation of the bar code, $\phi$, shown in FIG. 21. Step 518 performs a lengthwise scan 520, as shown in FIG. 21 at angle $\phi$ along the length of bar code 500. The bits are stored from the scan. Step 520 determines if the bits are all black. If the bits are not all black, then step 522 performs a second scan at angle $\phi$ along the other side of the bar code as shown in FIG. 21. Step 524 determines if those bits are all black, and if they are, step 526 determines that scan number 1 contains the information contained in a bar code. The process is then terminated at 514. If step 520 determines that the bits are all black, then a second scan is performed at 528. Step 530 determines whether the bits are all black. If the bits are all black from scan number 1 and number 2, then step 532 determines that the object is not a bar code and the process terminates at step 514. If the bits are not all black, then a determination is made at 534 that scan number 2 is the bar code data, and the process terminates at 514. If step 524 determines that the bits are not all black, then control is transferred to step 532 which determines that the object is not a bar code and the process terminates at 514. A check sum or other error detecting mechanism known to one skilled in the art of bar codes or signal processing, may be used to determine that the data is being correctly read. The check sum also ensures that at least one bit is zero, so that the bar code may be distinguished from a solid rectangle.

The bar code may be used to identify objects or, alternatively, to identify the spatial reference member 104.

In one embodiment, a high resolution bar code is used, and the actual program instructions for application program 300 are included on spatial reference member 104. In other embodiments, spatial reference member 104 carries program code on a magnetic strip which may be read by the system. Other ways of carrying program code will be apparent to those skilled in the art.

It has been shown that the position, orientation bounding box and area of objects are determined by data transmitted from optical detector 110 to application program 300. Thus, manipulation of the objects associated with spatial reference member 104 provide input to application program 300.

While this invention has been described in terms of several embodiments and specific examples, there are alterations, permutations, and equivalents which fall within the scope of this invention. It is therefore intended that the following appended claims be interpreted as including all such alterations, permutations, and equivalents as fall within the true spirit and scope of the present invention.

What is claimed is:

1. A method of providing input to a computer comprising:

providing a spatial reference member having a flexible body with a first surface and an opposing second surface, said opposing second surface having indicia;

deforming said flexible body;

determining information relating said deformation based on movement of said indicia;

using said information as an input to a computer implemented process.

* * * * *